US008489868B2

(12) United States Patent
Yach et al.

(10) Patent No.: US 8,489,868 B2
(45) Date of Patent: Jul. 16, 2013

(54) SOFTWARE CODE SIGNING SYSTEM AND METHOD

(75) Inventors: David P. Yach, Waterloo (CA); Michael S. Brown, Waterloo (CA); Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1974 days.

(21) Appl. No.: 10/381,219

(22) PCT Filed: Sep. 20, 2001

(86) PCT No.: PCT/CA01/01344
§ 371 (c)(1),
(2), (4) Date: Mar. 20, 2003

(87) PCT Pub. No.: WO02/25409
PCT Pub. Date: Mar. 28, 2002

(65) Prior Publication Data
US 2004/0025022 A1 Feb. 5, 2004

Related U.S. Application Data

(60) Provisional application No. 60/234,152, filed on Sep. 21, 2000, provisional application No. 60/235,354, filed on Sep. 26, 2000, provisional application No. 60/270,663, filed on Feb. 20, 2001.

(51) Int. Cl.
*G06F 21/00* (2006.01)
(52) U.S. Cl.
USPC ............... 713/1; 713/176; 713/187; 713/189; 719/328; 711/100

(58) Field of Classification Search
None
See application file for complete search history.

(56) References Cited

U.S. PATENT DOCUMENTS 5,625,690 A 4/1997 Michel et al.
5,978,484 A 11/1999 Apperson et al.
(Continued)

FOREIGN PATENT DOCUMENTS

AU 9736815 2/1998
CN 1541350 10/2004
(Continued)

OTHER PUBLICATIONS

Adams, Carlisle. IDUP and SPKM: Developing Pubic-Key-Based APIs and Mechanisms for Communication Security Services. Proceedings of the Symposium on Network and Distributed System Security. Pub. Date: 1996. Relevant pp. 128-135. Found on the World Wide Web at: http://ieeexplore.ieee.org/stamp/stamp.jsp?tp=&arnumber=492419.*

(Continued)

*Primary Examiner* — Nathan Flynn
*Assistant Examiner* — Jeremiah Avery
(74) *Attorney, Agent, or Firm* — Jon A. Gibbons; Fleit Gibbons Gutman Bongini & Bianco PL

(57) ABSTRACT

A code signing system and method is provided. The code signing system operates in conjunction with a signed software application having a digital signature and includes an application platform, an application programming interface (API), and a virtual machine. The API is configured to link the software application with the application platform. The virtual machine verifies the authenticity of the digital signature in order to control access to the API by the software application.

144 Claims, 7 Drawing Sheets

U.S. PATENT DOCUMENTS

| | | | |
|---|---|---|---|
| 6,067,582 | A | 5/2000 | Smith et al. |
| 6,157,721 | A | 12/2000 | Shear et al. |
| 6,212,636 | B1 * | 4/2001 | Boyle et al. ............... 713/168 |
| 6,223,291 | B1 | 4/2001 | Puhl et al. |
| 6,233,683 | B1 * | 5/2001 | Chan et al. ............... 713/172 |
| 6,256,737 | B1 * | 7/2001 | Bianco et al. ............. 713/186 |
| 6,289,382 | B1 | 9/2001 | Bowman-Amuah |
| 6,324,650 | B1 * | 11/2001 | Ogilvie ............................ 726/2 |
| 6,345,256 | B1 * | 2/2002 | Milsted et al. ................ 705/64 |
| 6,374,357 | B1 * | 4/2002 | Mohammed et al. ............ 726/5 |
| 6,390,374 | B1 * | 5/2002 | Carper et al. ................ 235/492 |
| 6,526,513 | B1 | 2/2003 | Shrader et al. |
| 6,574,609 | B1 * | 6/2003 | Downs et al. ................. 705/50 |
| 6,584,376 | B1 * | 6/2003 | Van Kommer ............... 700/245 |
| 6,587,837 | B1 * | 7/2003 | Spagna et al. ................. 705/52 |
| 6,697,948 | B1 * | 2/2004 | Rabin et al. .................... 726/30 |
| 6,748,541 | B1 * | 6/2004 | Margalit et al. ................. 726/9 |
| 6,766,353 | B1 | 7/2004 | Lin et al. |
| 6,795,919 | B1 * | 9/2004 | Gibbs et al. ................. 713/170 |
| 6,795,923 | B1 * | 9/2004 | Stern et al. .................... 726/12 |
| 6,895,507 | B1 * | 5/2005 | Teppler ........................... 726/19 |
| 7,243,236 | B1 * | 7/2007 | Sibert ............................ 713/179 |
| 2001/0044901 | A1 * | 11/2001 | Grawrock .................... 713/189 |
| 2002/0112078 | A1 | 8/2002 | Yach |
| 2002/0128036 | A1 | 9/2002 | Yach et al. |
| 2003/0026231 | A1 | 2/2003 | Lazaridis et al. |
| 2003/0159029 | A1 | 8/2003 | Brown et al. |
| 2004/0166834 | A1 | 8/2004 | Omar et al. |
| 2004/0170155 | A1 | 9/2004 | Omar et al. |
| 2004/0171369 | A1 | 9/2004 | Little et al. |
| 2004/0171374 | A1 | 9/2004 | Little et al. |
| 2004/0199665 | A1 | 10/2004 | Omar et al. |
| 2004/0202327 | A1 | 10/2004 | Little et al. |
| 2004/0205330 | A1 | 10/2004 | Godfrey et al. |
| 2005/0009502 | A1 | 1/2005 | Little et al. |

FOREIGN PATENT DOCUMENTS

| | | |
|---|---|---|
| CN | 100573402 | 12/2009 |
| CN | 101694687 | 4/2010 |
| CN | 101694688 | 5/2010 |
| CN | 101714201 | 5/2011 |
| EP | 0930793 | 7/1999 |
| EP | 1320795 | 11/2005 |
| EP | 1626324 | 2/2006 |
| EP | 1626325 | 9/2010 |
| EP | 1626326 | 9/2010 |
| EP | 2278429 | 1/2011 |
| EP | 2284644 | 2/2011 |
| EP | 2306259 | 4/2011 |
| EP | 2306260 | 4/2011 |
| HK | 1055629 | 5/2006 |
| HK | 1091666 | 1/2007 |
| HK | 1091665 | 11/2010 |
| HK | 1091667 | 11/2010 |
| WO | 9905600 | 2/1999 |
| WO | 02/25409 | 3/2002 |

OTHER PUBLICATIONS

Communication of Notices of Opposition (R. 57(1) EPC) dated Sep. 26, 2006 and Working Translation, 16 pages.
ISO/IEC FCD 7816-9 "Identification cards . . . ", Part 9: Additional interindustry commands and security attributes, Jun. 17, 1999, S. 8 bis 13, 29 bis 31 (D5), 12 pages.
ISO/IEC FDIS 7816-8 "Identification cards . . . ", Part 8: Security related interindustry commands, Jun. 25, 1998, S. 2, 3, 6 bis 13 (D6), 13 pages.
ISO/IEC 7816-4 "Information Technology—Identification Cards . . . ", Part 4: Interindustry Commands for Interchange, 1995, S. 12 bis 16 (D7), 6 pages.
European Search Report issued on May 15, 2009 in connection with European Patent Application No. 05024662.8.
Rankl, Wolfgang, et al., Handbuch der Chipkarten, Aufbau—Funktionsweise—Einsatz von Smart Cards, Hanser, 1999—in German.
Notice of Abandonment. Canadian Application No. 2,422,917. Dated: Jun. 20, 2011.
First Office Action. Chinese Application No. 200910207911.0. Dated: Aug. 10, 2011.
Extended European Search Report. European Application No. 10186194.6. Dated: Jun. 22, 2011.
Communication Pursuant to Rules 70(2) and 70a(2) and Reference to Rule 39(1) EPC. European Application No. 10186194.6. Dated: Jul. 25, 2011.
Communication Pursuant to Article 94(3) EPC. European Application No. 10183655.9. Dated: Feb. 23, 2011.
Communication Pursuant to Article 94(3) EPC. European Application No. 10183655.9. Dated: Jul. 13, 2011.
Extended European Search Report (EESR). European Application No. 10183997.5. Dated: Dec. 12, 2010.
Communication Pursuant to Article 94(3) EPC. European Application No. 10183997.5. Dated: Feb. 23, 2011.
Communication Pursuant to Article 94(3) EPC. European Application No. 10183997.5. Dated: Jul. 14, 2011.
Extended European Search Report. European Application No. 10186296.9. Dated: Jun. 22, 2011.
Communication Pursuant to Rules 70(2) and 70a(2) and Reference to Rule 39(1) EPC. European Application No. 10186296.9. Dated: Jul. 25, 2011.
Invitation pursuant to Article 94(3) and Rule 71(1) EPC dated Sep. 28, 2011, European Patent Application No. 10186296.9.
First Office Action. Chinese Application No. 200910209311.8. Dated: Oct. 19, 2011.
Chinese Office Action dated Sep. 8, 2011, Chinese Patent Application No. 200910207912.5.
Notice of Abandonment. Canadian Application No. 2,422,917. Dated: Nov. 15, 2011.
Notice of Allowance. Canadian Application No. 2,422,917. Dated: Sep. 27, 2010.
Office Action. Canadian Application No. 2,422,917. Dated: Mar. 4, 2009.
Office Action. Canadian Application No. 2,422,917. Dated: Mar. 13, 2008.
Written Opinion. Application No. PCT/CA01/01344. Dated: May 28, 2002.
International Search Report. Application No. PCT/CA01/01344. Dated: Apr. 22, 2002.
Preliminary Examination Report. Application No. PCT/CA01/01344. Dated: Nov. 15, 2002.
Communication under Rule 51(4) EPC. European Application No. 01973901.0. Dated: May 6, 2005.
Communication of a notice of opposition. European Application No. 01973901.0. Dated: Aug. 21, 2006.
Observations to opposition. European Application No. 01973901.0. Dated: May 7, 2007.
Handbuch Der Chipkarten, "Sicherung der Datenubertragung".
Summons to attend oral proceedings pursuant to Rule 115(1) EPC. European Application No. 01973901.0. Dated: Mar. 20, 2008.
Provision of the minutes in accordance with Rule 124(4) EPC. European Application No. 01973901.0. Dated: Dec. 22, 2008.
Interlocutory decision in Opposition proceedings (Art. 101(3)(a) and 106(2) EPC). European Application No. 01973901.0. Dated: Dec. 22, 2008.
First Office Action (English translation). Chinese Application No. 01819200.9. Dated: Aug. 26, 2005.
Second Office Action (English translation). Chinese Application No. 01819200.9. Dated: May 30, 2008.
Rejection Decision (English translation). Chinese Application No. 01819200.9. Dated: Sep. 26, 2008.
Request for Reexamination. Chinese Application No. 01819200.9. Dated: Dec. 24, 2008.
Third Office Action (English translation). Chinese Application No. 01819200.9. Dated: Apr. 17, 2009.
Certificate of Invention Patent (English translation). Chinese Application No. 01819200.9. Dated: Dec. 23, 2009.
Noting of loss of rights pursuant to Rule 112(1) EPC. European Application No. 05024661.0. Dated: Dec. 16, 2011.
Communication under Rule 71(3) EPC. European Application No. 05024661.0. Dated: Jun. 29, 2011.

Extended European Search Report (EESR). European Application No. 05024661.0. Dated: May 15, 2009.
Communication under Rule 71(3) EPC. European Application No. 05024662.8. Dated: Feb. 10, 2010.
Extended European Search Report (EESR). European Application No. 05024663.6. Dated: May 15, 2009.
Communication under Rule 71(3) EPC. European Application No. 05024663.6. Dated: Feb. 10, 2010.
Extended European Search Report (EESR). European Application No. 10183655.9. Dated: Dec. 30, 2010.
Extended European Search Report (EESR). European Application No. 10183997.5. Dated: Dec. 21, 2010.
ISO/IEC 7816-4 Part 4: "Interindustry commands for interchange" XP002269400.
Office Action dated May 11, 2012 for U.S. Appl. No. 13/413,173.
Office Action dated Nov. 30, 2012 for U.S. Appl. No. 13/413,173.
Java Platform Standard Ed. 6, http://docs.oracle.com/javase/6/docs/apl/java/lang/reflect/Method_html (last visited Nov. 3, 2012).
Application programming interface, http://en.wikipedia.org/windex.php?title=Application_programming_interface&oldid=520968418 (last visited Nov. 3, 2012).
ETSI TS 123 057 v3.3.0 (Oct. 16, 2000).
Devanbu, P.T., et al., "Techniques for trusted software engineering." Proceedings of the 20th International Conference on Software Engineering, p. 126-135. Apr. 19-25, Kyoto, Japan.
ETSI TA 123 057 v3.2.0 (Jun. 23, 2000).

* cited by examiner

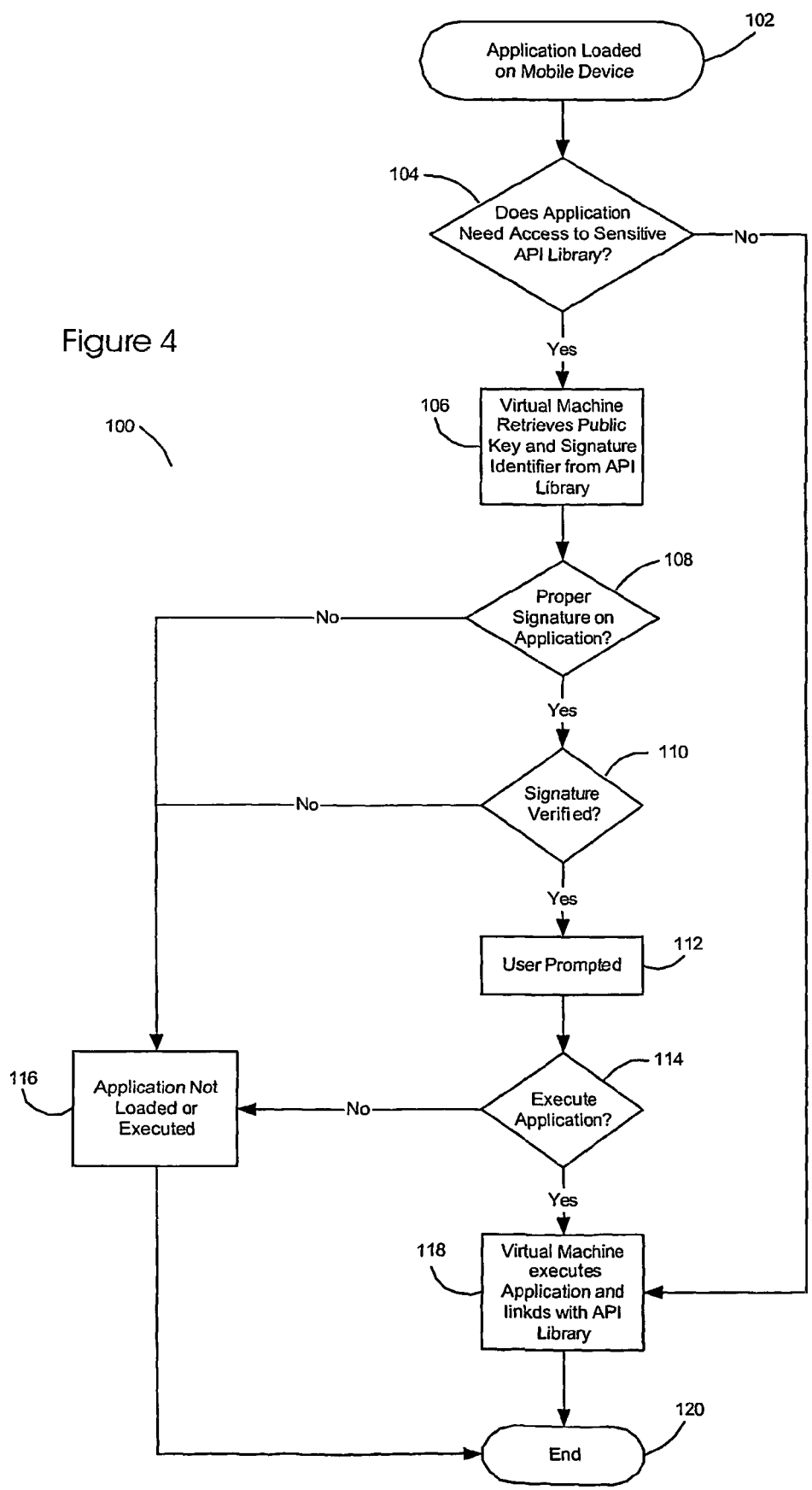

SOFTWARE CODE SIGNING SYSTEM AND METHOD

CROSS-REFERENCE TO RELATED APPLICATIONS

This application claims priority from and is related to the following prior applications: "Code Signing System And Method," U.S. Provisional Application No. 60/234,152, filed Sep. 21, 2000; "Code Signing System And Method," U.S. Provisional Application No. 60/235,354, filed Sep. 26, 2000; and "Code Signing System And Method," U.S. Provisional Application No. 60/270,663, filed Feb. 20, 2001.

BACKGROUND

1. Field of the Invention

This invention relates generally to the field of security protocols for software applications. More particularly, the invention provides a code signing system and method that is particularly well suited for Java™ applications for mobile communication devices, such as Personal Digital Assistants, cellular telephones, and wireless two-way communication devices (collectively referred to hereinafter as "mobile devices" or simply "devices").

2. Description of the Related Art

Security protocols involving software code signing schemes are known. Typically, such security protocols are used to ensure the reliability of software applications that are downloaded from the Internet. In a typical software code signing scheme, a digital signature is attached to a software application that identifies the software developer. Once the software is downloaded by a user, the user typically must use his or her judgment to determine whether or not the software application is reliable, based solely on his or her knowledge of the software developer's reputation. This type of code signing scheme does not ensure that a software application written by a third party for a mobile device will properly interact with the device's native applications and other resources. Because typical code signing protocols are not secure and rely solely on the judgment of the user, there is a serious risk that destructive, "Trojan horse" type software applications may be downloaded and installed onto a mobile device.

There also remains a need for network operators to have a system and method to maintain control over which software applications are activated on mobile devices.

There remains a further need in 2.5G and 3G networks where corporate clients or network operators would like to control the types of software on the devices issued to its employees.

SUMMARY

A code signing system and method is provided. The code signing system operates in conjunction with a software application having a digital signature and includes an application platform, an application programming interface (API), and a virtual machine. The API is configured to link the software application with the application platform. The virtual machine verifies the authenticity of the digital signature in order to control access to the API by the software application.

A code signing system for operation in conjunction with a software application having a digital signature, according to another embodiment of the invention comprises an application platform, a plurality of APIs, each configured to link the software application with a resource on the application platform, and a virtual machine that verifies the authenticity of the digital signature in order to control access to the API by the software application, wherein the virtual machine verifies the authenticity of the digital signature in order to control access to the plurality of APIs by the software application.

According to a further embodiment of the invention, a method of controlling access to sensitive application programming interfaces on a mobile device comprises the steps of loading a software application on the mobile device that requires access to a sensitive API, determining whether or not the software application includes a digital signature associated with the sensitive API, and if the software application does not include a digital signature associated with the sensitive API, then denying the software application access to the sensitive API.

In another embodiment of the invention, a method of controlling access to an application programming interface (API) on a mobile device by a software application created by a software developer comprises the steps of receiving the software application from the software developer, reviewing the software application to determine if it may access the API, if the software application may access the API, then appending a digital signature to the software application, verifying the authenticity of a digital signature appended to a software application, and providing access to the API to software applications for which the appended digital signature is authentic.

A method of restricting access to a sensitive API on a mobile device, according to a further embodiment of the invention, comprises the steps of registering one or more software developers that are trusted to design software applications which access the sensitive API, receiving a hash of a software application, determining if the software application was designed by one of the registered software developers, and if the software application was designed by one of the registered software developers, then generating a digital signature using the hash of the software application, wherein the digital signature may be appended to the software application, and the mobile device verifies the authenticity of the digital signature in order to control access to the sensitive API by the software application.

In a still further embodiment, a method of restricting access to application programming interfaces on a mobile device comprises the steps of loading a software application on the mobile device that requires access to one or more API, determining whether or not the software application includes a digital signature associated with the mobile device, and if the software application does not include a digital signature associated with the mobile device, then denying the software application access to the one or more APIs.

BRIEF DESCRIPTION OF THE DRAWINGS

FIG. 4 is a flow diagram illustrating the operation of the code signing system described above with reference to FIG. 3 and FIG. 3A;

DETAILED DESCRIPTION

Figure 1:
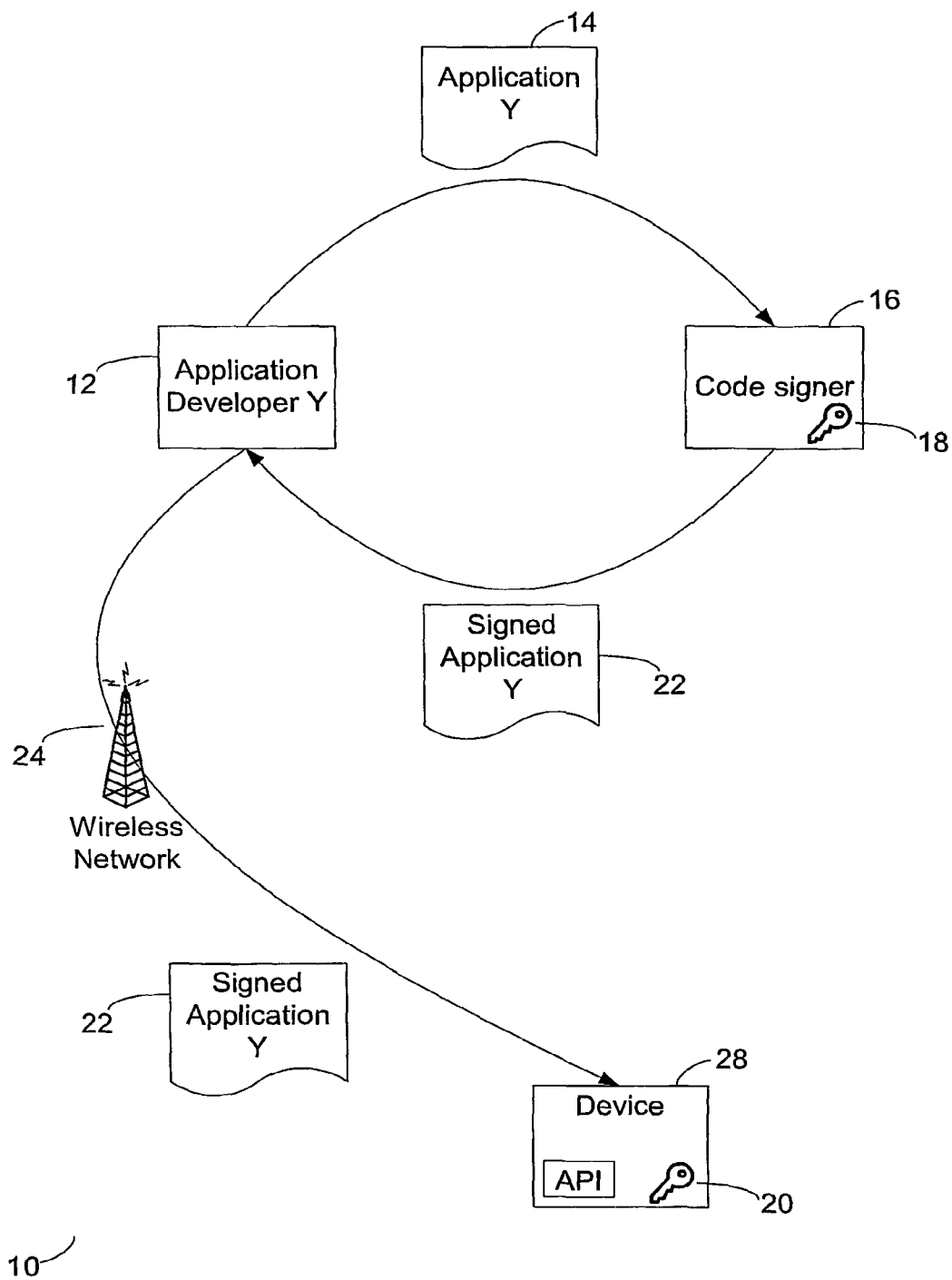
FIG. 1 is a diagram illustrating a code signing protocol according to one embodiment of the invention.

Referring now to the drawing figures, FIG. 1 is a diagram illustrating a code signing protocol according to one embodiment of the invention. An application developer 12 creates a software application 14 (application Y) for a mobile device that requires access to one or more sensitive APIs on the mobile device. The software application Y 14 may, for example, be a Java application that operates on a Java virtual machine installed on the mobile device. An API enables the software application Y to interface with an application platform that may include, for example, resources such as the device hardware, operating system and core software and data models. In order to make function calls to or otherwise interact with such device resources, a software application Y must access one or more APIs. APIs can thereby effectively "bridge" a software application and associated device resources. In this description and the appended claims, references to API access should be interpreted to include access of an API in such a way as to allow a software application Y to interact with one or more corresponding device resources. Providing access to any API therefore allows a software application Y to interact with associated device resources, whereas denying access to an API prevents the software application Y from interacting with the associated resources. For example, a database API may communicate with a device file or data storage system, and access to the database API would provide for interaction between a software application Y and the file or data storage system. A user interface (UI) API would communicate with controllers and/or control software for such device components as a screen, a keyboard, and any other device components that provide output to a user or accept input from a user. In a mobile device, a radio API may also be provided as an interface to wireless communication resources such as a transmitter and receiver. Similarly, a cryptographic API may be provided to interact with a crypto module which implements crypto algorithms on a device. These are merely illustrative examples of APIs that may be provided on a device. A device may include any of these example APIs, or different APIs instead of or in addition to those described above.

Preferably, any API may be classified as sensitive by a mobile device manufacturer, or possibly by an API author, a wireless network operator, a device owner or operator, or some other entity that may be affected by a virus or malicious code in a device software application. For instance, a mobile device manufacturer may classify as sensitive those APIs that interface with cryptographic routines, wireless communication functions, or proprietary data models such as address book or calendar entries. To protect against unauthorized access to these sensitive APIs, the application developer 12 is required to obtain one or more digital signatures from the mobile device manufacturer or other entity that classified any APIs as sensitive, or from a code signing authority 16 acting on behalf of the manufacturer or other entity with an interest in protecting access to sensitive device APIs, and append the signature(s) to the software application Y 14.

In one embodiment, a digital signature is obtained for each sensitive API or library that includes a sensitive API to which the software application requires access. In some cases, multiple signatures are desirable. This would allow a service provider, company or network operator to restrict some or all software applications loaded or updated onto a particular set of mobile devices. In this multiple-signature scenario, all APIs are restricted and locked until a "global" signature is verified for a software application. For example, a company may wish to prevent its employees from executing any software applications onto their devices without first obtaining permission from a corporate information technology (IT) or computer services department. All such corporate mobile devices may then be configured to require verification of at least a global signature before a software application can be executed. Access to sensitive device APIs and libraries, if any, could then be further restricted, dependent upon verification of respective corresponding digital signatures.

The binary executable representation of software application Y 14 may be independent of the particular type of mobile device or model of a mobile device. Software application Y 14 may for example be in a write-once-run-anywhere binary format such as is the case with Java software applications. However, it may be desirable to have a digital signature for each mobile device type or model, or alternatively for each mobile device platform or manufacturer. Therefore, software application Y 14 may be submitted to several code signing authorities if software application Y 14 targets several mobile devices.

Software application Y 14 is sent from the application developer 12 to the code signing authority 16. In the embodiment shown in FIG. 1, the code signing authority 16 reviews the software application Y 14, although as described in further detail below, it is contemplated that the code signing authority 16 may also or instead consider the identity of the application developer 12 to determine whether or not the software application Y 14 should be signed. The code signing authority 16 is preferably one or more representatives from the mobile device manufacturer, the authors of any sensitive APIs, or possibly others that have knowledge of the operation of the sensitive APIs to which the software application needs access.

If the code signing authority 16 determines that software application Y 14 may access the sensitive API and therefore should be signed, then a signature (not shown) for the software application Y 14 is generated by the code signing authority 16 and appended to the software application Y 14. The signed software application Y 22, comprising the software application Y 14 and the digital signature, is then returned to the application developer 12. The digital signature is preferably a tag that is generated using a private signature key 18 maintained solely by the code signing authority 16. For example, according to one signature scheme, a hash of the software application Y 14 may be generated, using a hashing algorithm such as the Secure Hash Algorithm SHA1, and then used with the private signature key 18 to create the digital signature. In some signature schemes, the private signature key is used to encrypt a hash of information to be signed, such as software application Y 14, whereas in other schemes, the private key may be used in other ways to generate a signature from the information to be signed or a transformed version of the information.

The signed software application Y 22 may then be sent to a mobile device 28 or downloaded by the mobile device 28 over a wireless network 24. It should be understood, however, that a code signing protocol according to the present invention is not limited to software applications that are downloaded over a wireless network. For instance, in alternative embodiments, the signed software application Y 22 may be downloaded to a personal computer via a computer network and loaded to the mobile device through a serial link, or may be acquired from the application developer 12 in any other manner and loaded onto the mobile device. Once the signed software application Y 22 is loaded on the mobile device 28, each digital signature is preferably verified with a public signature key 20 before the software application Y 14 is granted access to a sensitive API library. Although the signed software application Y 22 is loaded onto a device, it should be appreciated that the software application that may eventually be executed on the device is the software application Y 14. As described above, the signed software application Y 22 includes the software application Y 14 and one or more appended digital signatures (not shown). When the signatures are verified, the software application Y 14 can be executed on the device and access any APIs for which corresponding signatures have been verified.

The public signature key 20 corresponds to the private signature key 18 maintained by the code signing authority 16, and is preferably installed on the mobile device along with the sensitive API. However, the public key 10 may instead be obtained from a public key repository (not shown), using the device 28 or possibly a personal computer system, and installed on the device 28 as needed. According to one embodiment of a signature scheme, the mobile device 28 calculates a hash of the software application Y 14 in the signed software application Y 22, using the same hashing algorithm as the code signing authority 16, and uses the digital signature and the public signature key 20 to recover the hash calculated by the signing authority 16. The resultant locally calculated hash and the hash recovered from the digital signature are then compared, and if the hashes are the same, the signature is verified. The software application Y 14 can then be executed on the device 28 and access any sensitive APIs for which the corresponding signature(s) have been verified. As described above, the invention is in no way limited to this particular illustrative example signature scheme. Other signature schemes, including further public key signature schemes, may also be used in conjunction with the code signing methods and systems described herein.

Figure 2:
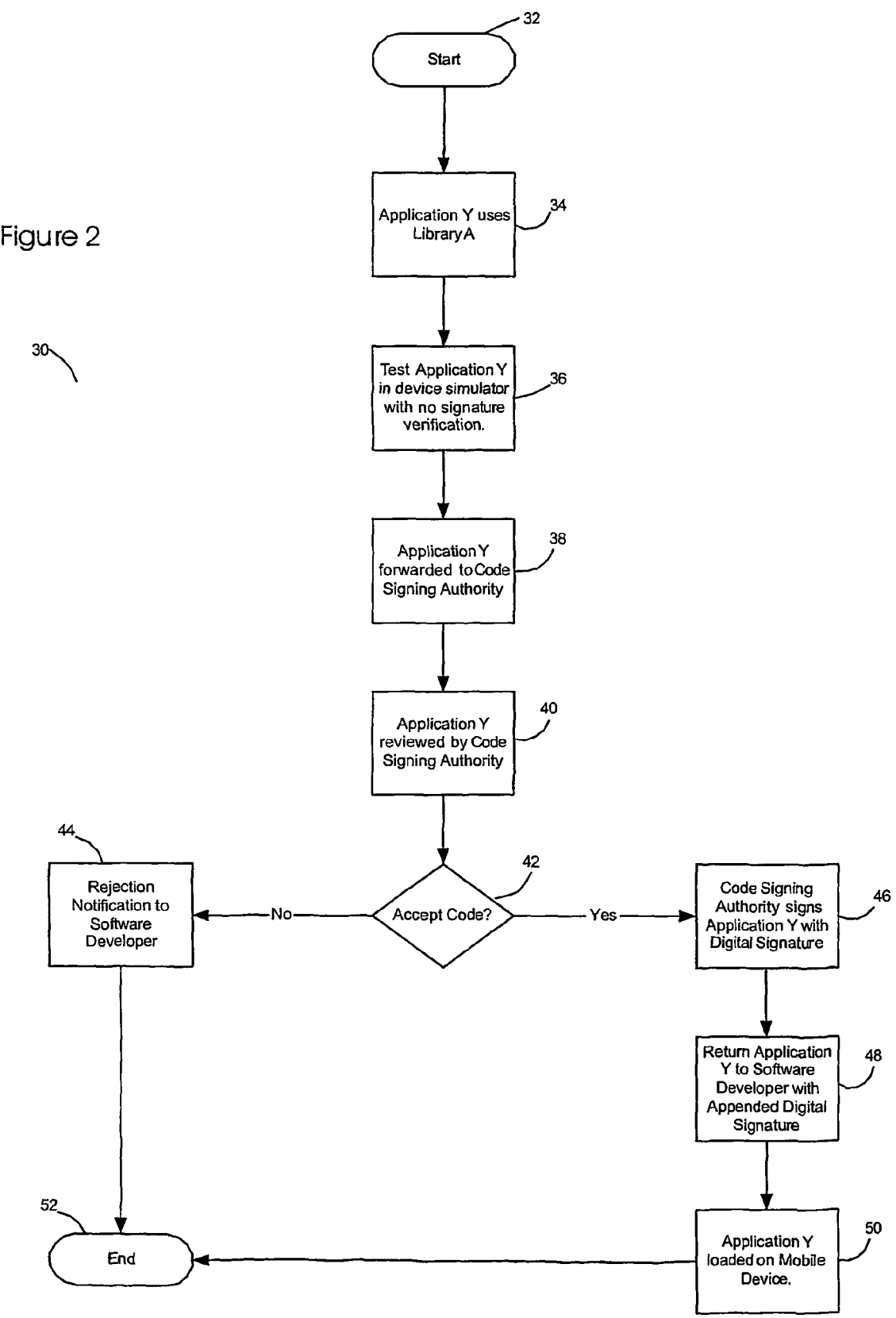
FIG. 2 is a flow diagram of the code signing protocol described above with reference to FIG. 1.

FIG. 2 is a flow diagram 30 of the code signing protocol described above with reference to FIG. 1. The protocol begins at step 32. At step 34, a software developer writes the software application Y for a mobile device that requires access to a sensitive API or library that exposes a sensitive API (API library A). As discussed above, some or all APIs on a mobile device may be classified as sensitive, thus requiring verification of a digital signature for access by any software application such as software application Y. In step 36, application Y is tested by the software developer, preferably using a device simulator in which the digital signature verification function has been disabled. In this manner, the software developer may debug the software application Y before the digital signature is acquired from the code signing authority. Once the software application Y has been written and debugged, it is forwarded to the code signing authority in step 38.

In steps 40 and 42, the code signing authority reviews the software application Y to determine whether or not it should be given access to the sensitive API, and either accepts or rejects the software application. The code signing authority may apply a number of criteria to determine whether or not to grant the software application access to the sensitive API including, for example, the size of the software application, the device resources accessed by the API, the perceived utility of the software application, the interaction with other software applications, the inclusion of a virus or other destructive code, and whether or not the developer has a contractual obligation or other business arrangement with the mobile device manufacturer. Further details of managing code signing authorities and developers are described below in reference to FIG. 5.

If the code signing authority accepts the software application Y, then a digital signature, and preferably a signature identification, are appended to the software application Y in step 46. As described above, the digital signature may be generated by using a hash of the software application Y and a private signature key 18. The signature identification is described below with reference to FIGS. 3 and 4. Once the digital signature and signature identification are appended to the software application Y to generate a signed software application, the signed software application Y is returned to the software developer in step 48. The software developer may then license the signed software application Y to be loaded onto a mobile device (step 50). If the code signing authority rejects the software application Y, however, then a rejection notification is preferably sent to the software developer (step 44), and the software application Y will be unable to access any API(s) associated with the signature.

In an alternative embodiment, the software developer may provide the code signing authority with only a hash of the software application Y, or provide the software application Y in some type of abridged format. If the software application Y is a Java application, then the device independent binary *.class files may be used in the hashing operation, although device dependent files such as *.cod files used by the assignee of the present application may instead be used in hashing or other digital signature operations when software applications are intended for operation on particular devices or device types. By providing only a hash or abridged version of the software application Y, the software developer may have the software application Y signed without revealing proprietary code to the code signing authority. The hash of the software application Y, along with the private signature key 18, may then be used by the code signing authority to generate the digital signature. If an otherwise abridged version of the software application Y is sent to the code signing authority, then the abridged version may similarly be used to generate the digital signature, provided that the abridging scheme or algorithm, like a hashing algorithm, generates different outputs for different inputs. This ensures that every software application will have a different abridged version and thus a different signature that can only be verified when appended to the particular corresponding software application from which the abridged version was generated. Because this embodiment does not enable the code signing authority to thoroughly review the software application for viruses or other destructive code, however, a registration process between the software developer and the code signing authority may also be required. For instance, the code signing authority may agree in advance to provide a trusted software developer access to a limited set of sensitive APIs.

In still another alternative embodiment, a software application Y may be submitted to more than one signing authority. Each signing authority may for example be responsible for signing software applications for particular sensitive APIs or APIs on a particular model of mobile device or set of mobile devices that supports the sensitive APIs required by a software application. A manufacturer, mobile communication network operator, service provider, or corporate client for example may thereby have signing authority over the use of sensitive APIs for their particular mobile device model(s), or the mobile devices operating on a particular network, subscribing to one or more particular services, or distributed to corporate employees. A signed software application may then include a software application and at least one appended digital signature appended from each of the signing authorities. Even though these signing authorities in this example would be generating a signature for the same software application, different signing and signature verification schemes may be associated with the different signing authorities.

Figure 3:
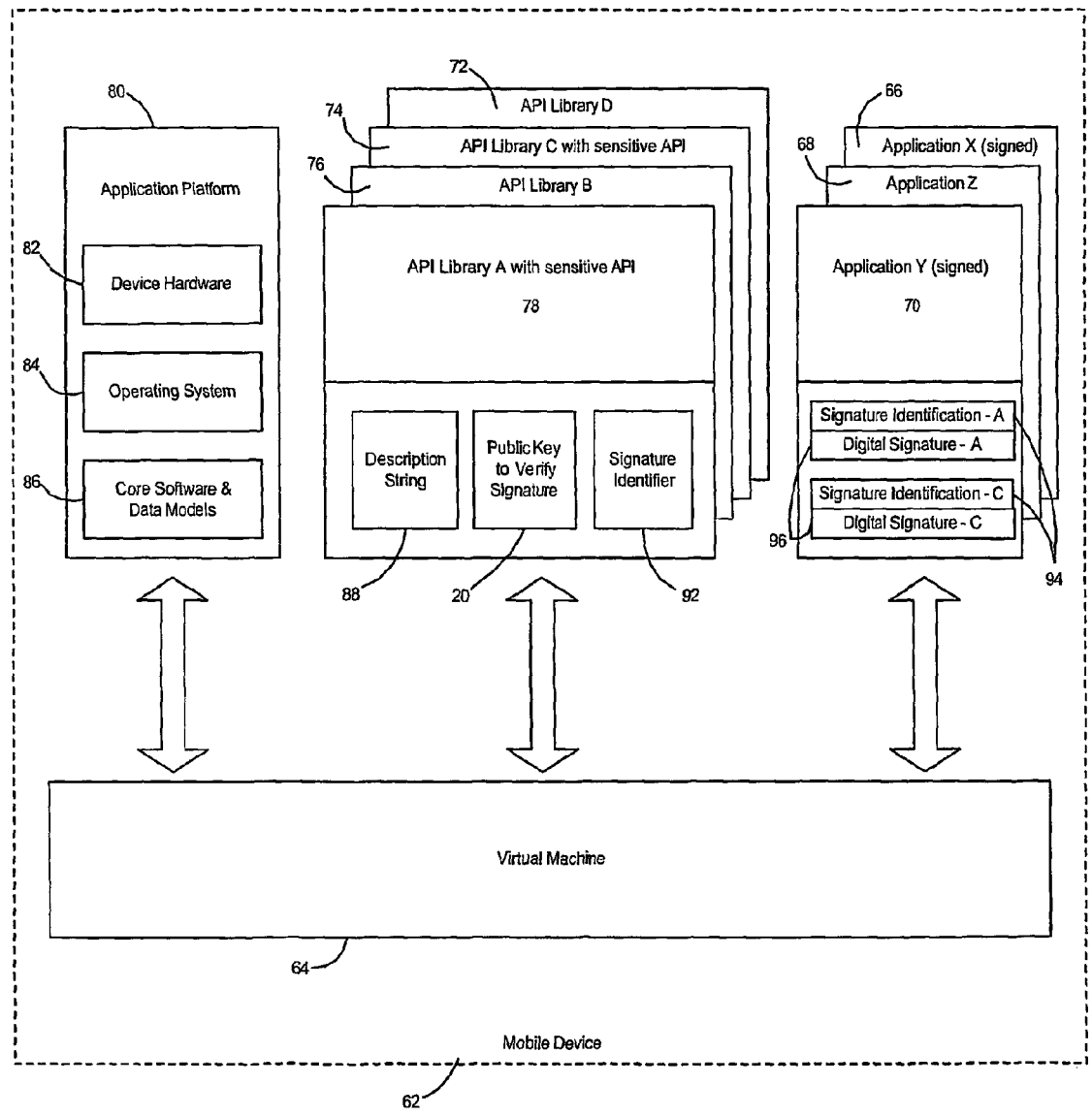
FIG. 3 is a block diagram of a code signing system on a mobile device.

FIG. 3 is a block diagram of a code signing system 60 on a mobile device 62. The system 60 includes a virtual machine 64, a plurality of software applications 66-70, a plurality of API libraries 72-78, and an application platform 80. The application platform 80 preferably includes all of the resources on the mobile device 62 that may be accessed by the software applications 66-70. For instance, the application platform may include device hardware 82, the mobile device's operating system 84, or core software and data models 86. Each API library 72-78 preferably includes a plurality of APIs that interface with a resource available in the application platform. For instance, one API library might include all of the APIs that interface with a calendar program and calendar entry data models. Another API library might include all of the APIs that interface with the transmission circuitry and functions of the mobile device 62. Yet another API library might include all of the APIs capable of interfacing with lower-level services performed by the mobile device's operating system 84. In addition, the plurality of API libraries 72-78 may include both libraries that expose a sensitive API 74 and 78, such as an interface to a cryptographic function, and libraries 72 and 76, that may be accessed without exposing sensitive APIs. Similarly, the plurality of software applications 66-70 may include both signed software applications 66 and 70 that require access to one or more sensitive APIs, and unsigned software applications such as 68. The virtual machine 64 is preferably an object oriented run-time environment such as Sun Micro System's J2ME™ (Java 2 Platform, Micro Edition), which manages the execution of all of the software applications 66-70 operating on the mobile device 62, and links the software applications 66-70 to the various API libraries 72-78.

Software application Y 70 is an example of a signed software application. Each signed software application preferably includes an actual software application such as software application Y comprising for example software code that can be executed on the application platform 80, one or more signature identifications 94 and one or more corresponding digital signatures 96. Preferably each digital signature 96 and associated signature identification 94 in a signed software application 66 or 70 corresponds to a sensitive API library 74 or 78 to which the software application X or software application Y requires access. The sensitive API library 74 or 78 may include one or more sensitive APIs. In an alternative embodiment, the signed software applications 66 and 70 may include a digital signature 96 for each sensitive API within an API library 74 or 78. The signature identifications 94 may be unique integers or some other means of relating a digital signature 96 to a specific API library 74 or 78, API, application platform 80, or model of mobile device 62.

API library A 78 is an example of an API library that exposes a sensitive API. Each API library 74 and 78 including a sensitive API should preferably include a description string 88, a public signature key 20, and a signature identifier 92. The signature identifier 92 preferably corresponds to a signature identification 94 in a signed software application 66 or 70, and enables the virtual machine 64 to quickly match a digital signature 96 with an API library 74 or 78. The public signature key 20 corresponds to the private signature key 18 maintained by the code signing authority, and is used to verify the authenticity of a digital signature 96. The description string 88 may for example be a textual message that is displayed on the mobile device when a signed software application 66 or 70 is loaded, or alternatively when a software application X or Y attempts to access a sensitive API.

Operationally, when a signed software application 68-70, respectively including a software application X, Z, or Y, that requires access to a sensitive API library 74 or 78 is loaded onto a mobile device, the virtual machine 64 searches the signed software application for an appended digital signature 96 associated with the API library 74 or 78. Preferably, the appropriate digital signature 96 is located by the virtual machine 64 by matching the signature identifier 92 in the API library 74 or 78 with a signature identification 94 on the signed software application. If the signed software application includes the appropriate digital signature 96, then the virtual machine 64 verifies its authenticity using the public signature key 20. Then, once the appropriate digital signature 96 has been located and verified, the description string 88 is preferably displayed on the mobile device before the software application X or Y is executed and accesses the sensitive API. For instance, the description string 88 may display a message stating that "Application Y is attempting to access API Library A," and thereby provide the mobile device user with the final control to grant or deny access to the sensitive API.

Figure 3A:
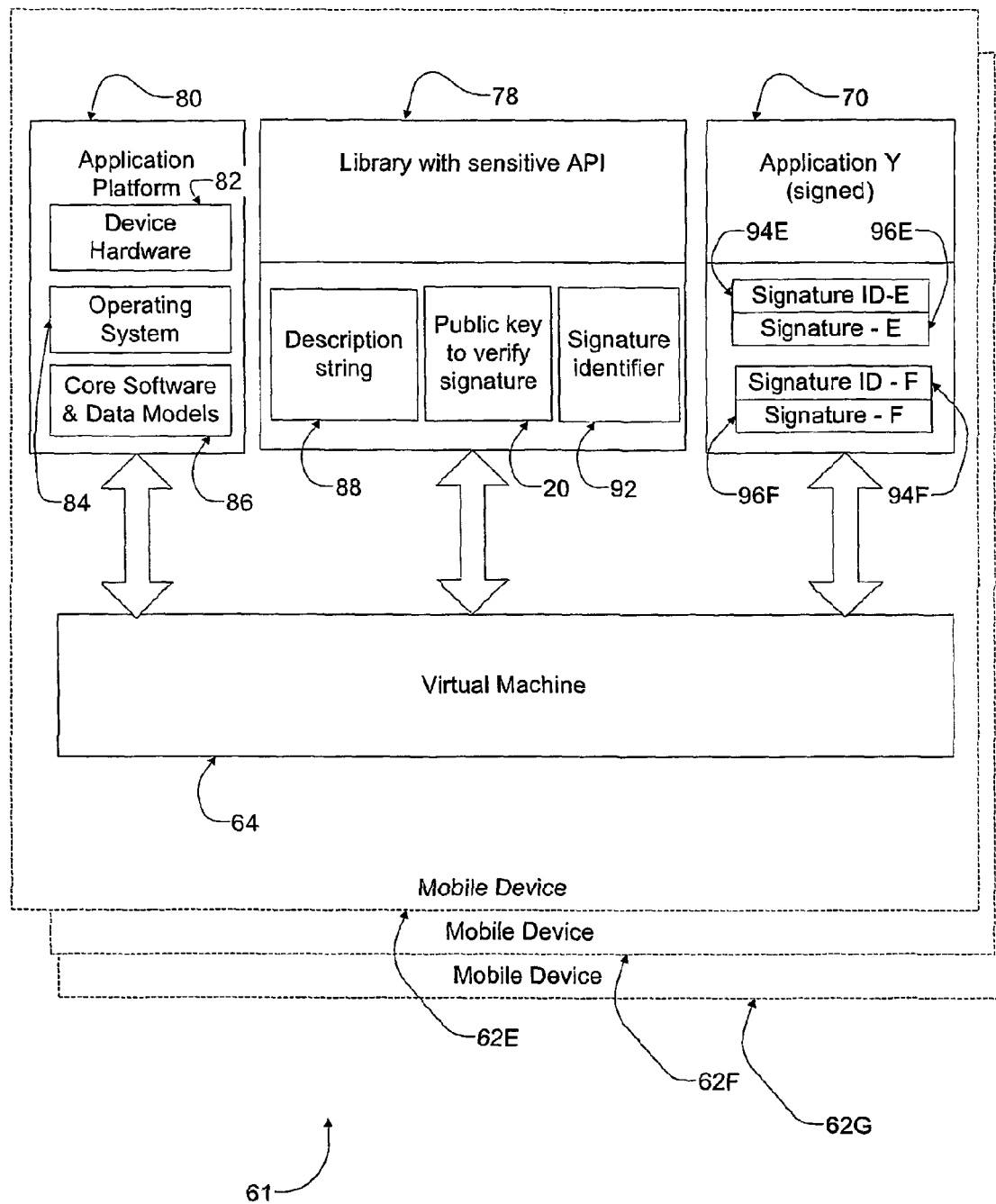
FIG. 3A is a block diagram of a code signing system on a plurality of mobile devices.

FIG. 3A is a block diagram of a code signing system 61 on a plurality of mobile devices 62E, 62F and 62G. The system 61 includes a plurality of mobile devices each of which only three are illustrated, mobile devices 62E, 62F and 62G. Also shown is a signed software application 70, including a software application Y to which two digital signatures 96E and 96F with corresponding signature identifications 94E and 94F have been appended. In the example system 61, each pair composed of a digital signature and identification, 94E/96E and 94F/96F, corresponds to a model of mobile device 62, API library 78, or associated platform 80. If signature identifications 94E and 94F correspond to different models of mobile device 62, then when a signed software application 70 which includes a software application Y that requires access to a sensitive API library 78 is loaded onto mobile device 62E, the virtual machine 64 searches the signed software application 70 for a digital signature 96E associated with the API library 78 by matching identifier 94E with signature identifier 92. Similarly, when a signed software application 70 including a software application Y that requires access to a sensitive API library 78 is loaded onto a mobile device 62F, the virtual machine 64 in device 62F searches the signed software application 70 for a digital signature 96F associated with the API library 78. However, when a software application Y in a signed software application 70 that requires access to a sensitive API library 78 is loaded onto a mobile device model for which the application developer has not obtained a digital signature, device 62G in the example of FIG. 3A, the virtual machine 64 in the device 64G does not find a digital signature appended to the software application Y and consequently, access to the API library 78 is denied on device 62G. It should be appreciated from the foregoing description that a software application such as software application Y may have multiple device-specific, library-specific, or API-specific signatures or some combination of such signatures appended thereto. Similarly, different signature verification requirements may be configured for the different devices. For example, device 62E may require verification of both a global signature, as well as additional signatures for any sensitive APIs to which a software application, requires access in order for the software application to be executed, whereas device 62F may require verification of only a global signature and device 62G may require verification of signatures only for its sensitive APIs. It should also be apparent that a communication system may include devices (not shown) on which a software application Y received as part of a signed software application such as 70 may execute without any signature verification. Although a signed software application has one or more signatures appended thereto, the software application Y might possibly be executed on some devices without first having any of its signature(s) verified. Signing of a software application preferably does not interfere with its execution on devices in which digital signature verification is not implemented.

FIG. 4 is a flow diagram 100 illustrating the operation of the code signing system described above with reference to FIGS. 3 and 3A. In step 102, a software application is loaded onto a mobile device. Once the software application is loaded, the device, preferably using a virtual machine, determines whether or not the software application requires access to any API libraries that expose a sensitive API (step 104). If not, then the software application is linked with all of its required API libraries and executed (step 118). If the software application does require access to a sensitive API, however, then the virtual machine verifies that the software application includes a valid digital signature associated with any sensitive APIs to which access is required, in steps 106-116.

In step 106, the virtual machine retrieves the public signature key 20 and signature identifier 92 from the sensitive API library. The signature identifier 92 is then used by the virtual machine in step 108 to determine whether or not the software application has an appended digital signature 96 with a corresponding signature identification 94. If not, then the software application has not been approved for access to the sensitive API by a code signing authority, and the software application is preferably prevented from being executed in step 116. In alternative embodiments, a software application without a proper digital signature 96 may be purged from the mobile device, or may be denied access to the API library exposing the sensitive API but executed to the extent possible without access to the API library. It is also contemplated that a user may be prompted for an input when signature verification fails, thereby providing for user control of such subsequent operations as purging of the software application from the device.

If a digital signature 96 corresponding to the sensitive API library is appended to the software application and located by the virtual machine, then the virtual machine uses the public key 20 to verify the authenticity of the digital signature 96 in step 110. This step may be performed, for example, by using the signature verification scheme described above or other alternative signature schemes. If the digital signature 96 is not authentic, then the software application is preferably either not executed, purged, or restricted from accessing the sensitive API as described above with reference to step 116. If the digital signature is authentic, however, then the description string 88 is preferably displayed in step 112, warning the mobile device user that the software application requires access to a sensitive API, and possibly prompting the user for authorization to execute or load the software application (step 114). When more than one signature is to be verified for a software application, then the steps 104-110 are preferably repeated for each signature before the user is prompted in step 112. If the mobile device user in step 114 authorizes the software application, then it may be executed and linked to the sensitive API library in step 118.

Figure 5:
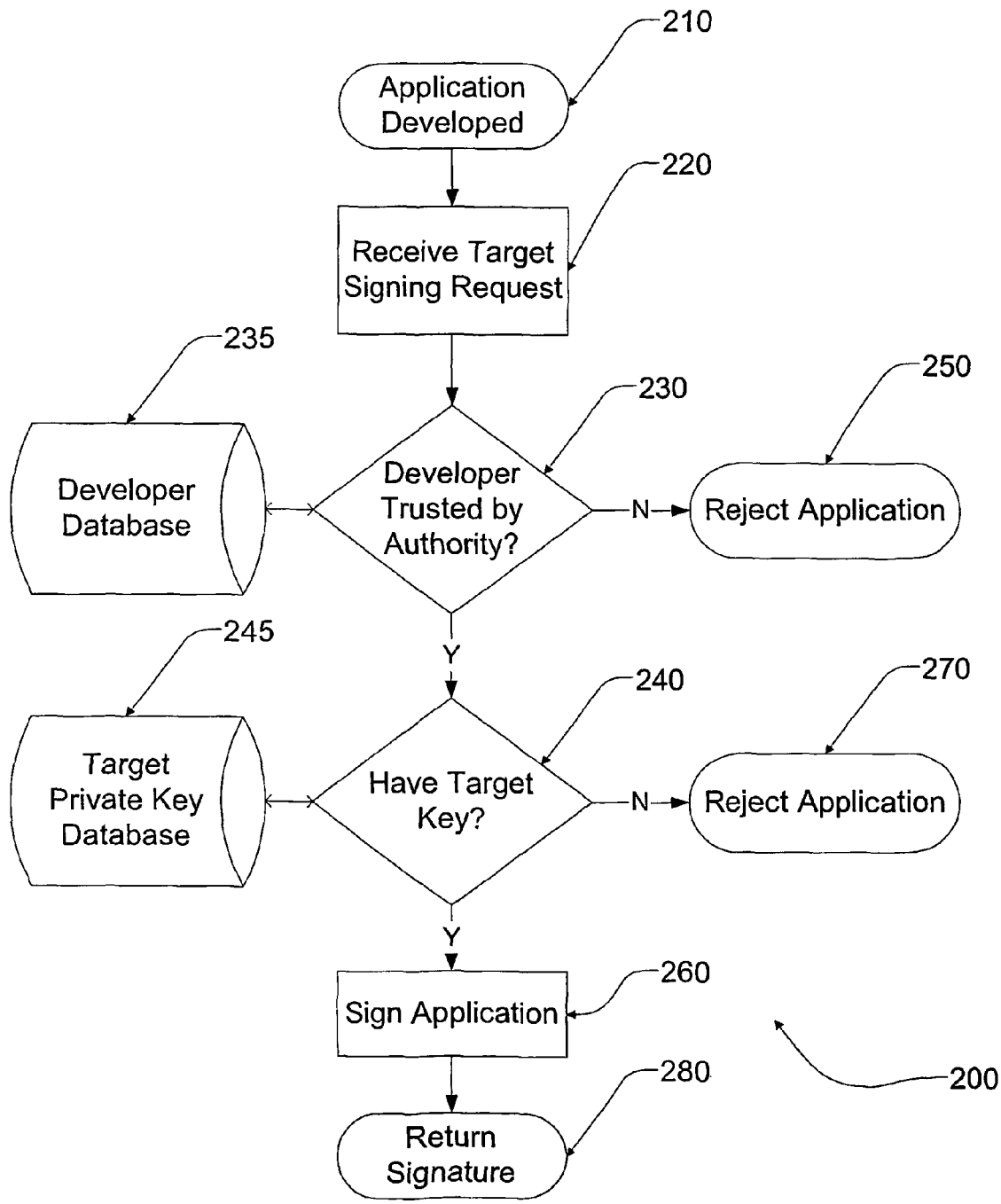
FIG. 5 is a flow diagram illustrating the management of the code signing authorities described with reference to FIG. 3A.

FIG. 5 is a flow diagram 200 illustrating the management of the code signing authorities described with reference to FIG. 3A. At step 210, an application developer has developed a new software application which is intended to be executable one or more target device models or types. The target devices may include sets of devices from different manufacturers, sets of device models or types from the same manufacturer, or generally any sets of devices having particular signature and verification requirements. The term "target device" refers to any such set of devices having a common signature requirement. For example, a set of devices requiring verification of a device-specific global signature for execution of all software applications may comprise a target device, and devices that require both a global signature and further signatures for sensitive APIs may be part of more than one target device set. The software application may be written in a device independent manner by using at least one known API, supported on at least one target device with an API library. Preferably, the developed software application is intended to be executable on several target devices, each of which has its own at least one API library.

At step 220, a code signing authority for one target device receives a target-signing request from the developer. The target signing request includes the software application or a hash of the software application, a developer identifier, as well as at least one target device identifier which identifies the target device for which a signature is being requested. At step 230, the signing authority consults a developer database 235 or other records to determine whether or not to trust developer 220. This determination can be made according to several criteria discussed above, such as whether or not the developer has a contractual obligation or has entered into some other type of business arrangement with a device manufacturer, network operator, service provider, or device manufacturer. If the developer is trusted, then the method proceeds at step 240. However, if the developer is not trusted, then the software application is rejected (250) and not signed by the signing authority. Assuming the developer was trusted, at step 240 the signing authority determines if it has the target private key corresponding to the submitted target identifier by consulting a private key store such as a target private key database 245. If the target private key is found, then a digital signature for the software application is generated at step 260 and the digital signature or a signed software application including the digital signature appended to the software application is returned to the developer at step 280. However, if the target private key is not found at step 240, then the software application is rejected at step 270 and no digital signature is generated for the software application.

Advantageously, if target signing authorities follow compatible embodiments of the method outlined in FIG. 5, a network of target signing authorities may be established in order to expediently manage code signing authorities and a developer community code signing process providing signed software applications for multiple targets with low likelihood of destructive code.

Should any destructive or otherwise problematic code be found in a software application or suspected because of behavior exhibited when a software application is executed on a device, then the registration or privileges of the corresponding application developer with any or all signing authorities may also be suspended or revoked, since the digital signature provides an audit trail through which the developer of a problematic software application may be identified. In such an event, devices may be informed of the revocation by being configured to periodically download signature revocation lists, for example. If software applications for which the corresponding digital signatures have been revoked are running on a device, the device may then halt execution of any such software application and possibly purge the software application from its local storage. If preferred, devices may also be configured to re-execute digital signature verifications, for instance periodically or when a new revocation list is downloaded.

Although a digital signature generated by a signing authority is dependent upon authentication of the application developer and confirmation that the application developer has been properly registered, the digital signature is preferably generated from a hash or otherwise transformed version of the software application and is therefore application-specific. This contrasts with known code signing schemes, in which API access is granted to any software applications arriving from trusted application developers or authors. In the code signing systems and methods described herein, API access is granted on an application-by-application basis and thus can be more strictly controlled or regulated.

Figure 6:
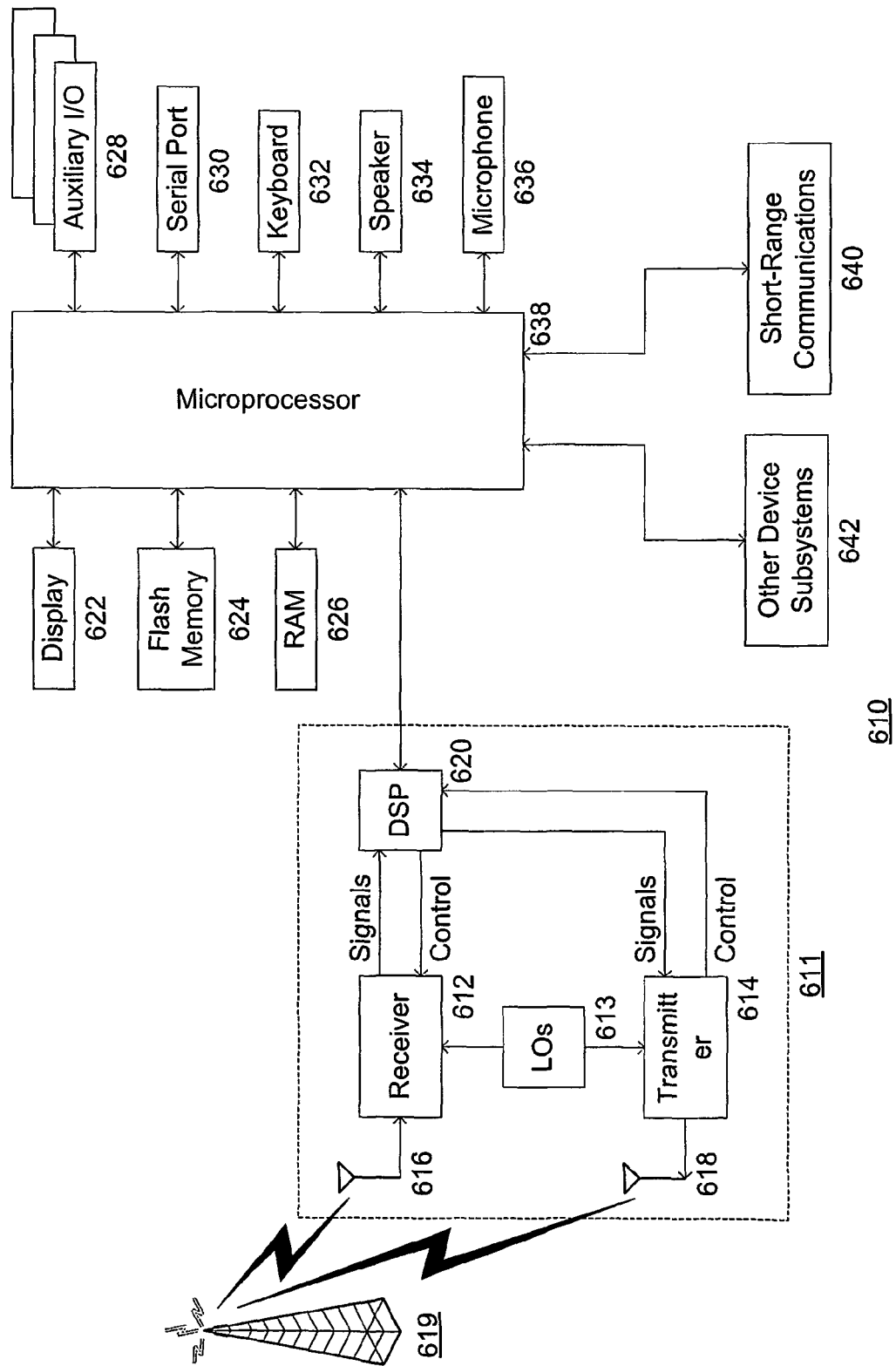
FIG. 6 is a block diagram of a mobile communication device in which a code signing system and method may be implemented.

FIG. 6 is a block diagram of a mobile communication device in which a code signing system and method may be implemented. The mobile communication device 610 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 610 is enabled for two-way communications, the device will incorporate a communication subsystem 611, including a receiver 612, a transmitter 614, and associated components such as one or more, preferably embedded or internal, antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate. For example, a device 610 destined for a North American market may include a communication subsystem 611 designed to operate within the Mobitex™ mobile communication system or DataTAC™ mobile communication system, whereas a device 610 intended for use in Europe may incorporate a General Packet Radio Service (GPRS) communication subsystem 611.

Network access requirements will also vary depending upon the type of network 919. For example, in the Mobitex and DataTAC networks, mobile devices such as 610 are registered on the network using a unique identification number associated with each device. In GPRS networks however, network access is associated with a subscriber or user of a device 610. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the device 610 will be unable to carry out any functions involving communications over network 619, other than any legally required operations such as "911" emergency calling.

When required network registration or activation procedures have been completed, a device 610 may send and receive communication signals over the network 619. Signals received by the antenna 616 through a communication network 619 are input to the receiver 612, which may perform such common receiver functions as signal amplification, frequency down conversion, filtering, channel selection and the like, and in the example system shown in FIG. 6, analog to digital conversion. Analog to digital conversion of a received signal allows more complex communication functions such as demodulation and decoding to be performed in the DSP 620. In a similar manner, signals to be transmitted are processed, including modulation and encoding for example, by the DSP 620 and input to the transmitter 614 for digital to analog conversion, frequency up conversion, filtering, amplification and transmission over the communication network 619 via the antenna 618.

The DSP 620 not only processes communication signals, but also provides for receiver and transmitter control. For example, the gains applied to communication signals in the receiver 612 and transmitter 614 may be adaptively controlled through automatic gain control algorithms implemented in the DSP 620.

The device 610 preferably includes a microprocessor 638 which controls the overall operation of the device. Communication functions, including at least data and voice communications, are performed through the communication subsystem 611. The microprocessor 638 also interacts with further device subsystems or resources such as the display 622, flash memory 624, random access memory (RAM) 626, auxiliary input/output (I/O) subsystems 628, serial port 630, keyboard 632, speaker 634, microphone 636, a short-range communications subsystem 640 and any other device subsystems generally designated as 642. APIs, including sensitive APIs requiring verification of one or more corresponding digital signatures before access is granted, may be provided on the device 610 to interface between software applications and any of the resources shown in FIG. 6.

Some of the subsystems shown in FIG. 6 perform communication-related functions, whereas other subsystems may provide "resident" or on-device functions. Notably, some subsystems, such as keyboard 632 and display 622 for example, may be used for both communication-related functions, such as entering a text message for transmission over a communication network, and device-resident functions such as a calculator or task list.

Operating system software used by the microprocessor 638, and possibly APIs to be accessed by software applications, is preferably stored in a persistent store such as flash memory 624, which may instead be a read only memory (ROM) or similar storage element (not shown). Those skilled in the art will appreciate that the operating system, specific device software applications, or parts thereof, may be temporarily loaded into a volatile store such as RAM 626. It is contemplated that received and transmitted communication signals may also be stored to RAM 626.

The microprocessor 638, in addition to its operating system functions, preferably enables execution of software applications on the device. A predetermined set of applications which control basic device operations, including at least data and voice communication applications for example, will normally be installed on the device 610 during manufacture. A preferred application that may be loaded onto the device may be a personal information manager (PIM) application having the ability to organize and manage data items relating to the device user such as, but not limited to e-mail, calendar events, voice mails, appointments, and task items. Naturally, one or more memory stores would be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system thereby creating a mirrored host computer on the mobile device with respect to the data items at least. This would be especially advantageous in the case where the host computer system is the mobile device user's office computer system. Further applications, including signed software applications as described above, may also be loaded onto the device 610 through the network 619, an auxiliary I/O subsystem 62S, serial port 630, short-range communications subsystem 640 or any other suitable subsystem 642. The device microprocessor 638 may then verify any digital signatures, possibly including both "global" device signatures and API-specific signatures, appended to such a software application before the software application can be executed by the microprocessor 638 and/or access any associated sensitive APIs. Such flexibility in application installation increases the functionality of the device and may provide enhanced on-device functions, communication-related functions, or both. For example, secure communication applications may enable electronic commerce functions and other such financial transactions to be performed using the device 610, through a crypto API and a crypto module which implements crypto algorithms on the device (not shown).

In a data communication mode, a received signal such as a text message or web page download will be processed by the communication subsystem 611 and input to the microprocessor 638, which will preferably further process the received signal for output to the display 622, or alternatively to an auxiliary I/O device 628. A user of device 610 may also compose data items such as email messages for example, using the keyboard 632, which is preferably a complete alphanumeric keyboard or telephone-type keypad, in conjunction with the display 622 and possibly an auxiliary I/O device 628. Such composed items may then be transmitted over a communication network through the communication subsystem 611.

For voice communications, overall operation of the device 610 is substantially similar, except that received signals would preferably be output to a speaker 634 and signals for transmission would be generated by a microphone 636. Alternative voice or audio I/O subsystems such as a voice message recording subsystem may also be implemented on the device 610. Although voice or audio signal output is preferably accomplished primarily through the speaker 634, the display 622 may also be used to provide an indication of the identity of a calling party, the duration of a voice call, or other voice call related information for example.

The serial port 630 in FIG. 6 would normally be implemented in a personal digital assistant (PDA)-type communication device for which synchronization with a user's desktop computer (not shown) may be desirable, but is an optional device component. Such a port 630 would enable a user to set preferences through an external device or software application and would extend the capabilities of the device by providing for information or software downloads to the device 610 other than through a wireless communication network. The alternate download path may for example be used to load an encryption key onto the device through a direct and thus reliable and trusted connection to thereby enable secure device communication.

A short-range communications subsystem 640 is a further optional component which may provide for communication between the device 624 and different systems or devices, which need not necessarily be similar devices. For example, the subsystem 640 may include an infrared device and associated circuits and components or a Bluetooth™ communication module to provide for communication with similarly-enabled systems and devices.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

For example, when a software application is rejected at step 250 in the method shown in FIG. 5, the signing authority may request that the developer sign a contract or enter into a business relationship with a device manufacturer or other entity on whose behalf the signing authority acts. Similarly, if a software application is rejected at step 270, authority to sign the software application may be delegated to a different signing authority. The signing of a software application following delegation of signing of the software application to the different authority can proceed substantially as shown in FIG. 5, wherein the target signing authority that received the original request from the trusted developer at step 220 requests that the software application be signed by the different signing authority on behalf of the trusted developer from the target signing authority. Once a trust relationship has been established between code signing authorities, target private code signing keys could be shared between code signing authorities to improve performance of the method at step 240, or a device may be configured to validate digital signatures from either of the trusted signing authorities.

In addition, although described primarily in the context of software applications, code signing systems and methods according to the present invention may also be applied to other device-related components, including but in no way limited to, commands and associated command arguments, and libraries configured to interface with device resources. Such commands and libraries may be sent to mobile devices by device manufacturers, device owners, network operators, service providers, software application developers and the like. It would be desirable to control the execution of any command that may affect device operation, such as a command to change a device identification code or wireless communication network address for example, by requiring verification of one or more digital signatures before a command can be executed on a device, in accordance with the code signing systems and methods described and claimed herein.

We claim:

1. A mobile device containing software instructions which when executed on the mobile device cause the mobile device to perform operations for controlling access to an application platform of the mobile device, the operations comprising:

storing a plurality of application programming interfaces (APIs) at the mobile device, wherein at least one API comprises a sensitive API to which access is restricted;

receiving, at the mobile device, an indication that a software application on the mobile device is requesting access to the sensitive API stored at the mobile device;

determining, at the mobile device, whether the software application is signed, wherein a signed software application includes a digital signature generated using a private key of a private key-public key pair, wherein the private key is not accessible to the mobile device;

the mobile device using a public key of the private key-public key pair to verify the digital signature of the software application; and based upon verifying the digital signature at the mobile device, the mobile device allowing the software application access to the sensitive API.

2. The mobile device of claim 1, wherein based upon a determination that the software application requesting access to the sensitive API does not include a signature, the operations further comprise: preventing execution of the software application.

3. The mobile device of claim 1, wherein based upon a determination that the software application requesting access to the sensitive API does not include a signature, the operations further comprise: denying the software application access to the sensitive API.

4. The mobile device of claim 1, wherein based upon a determination that the software application requesting access to the sensitive API does not include a signature, the operations further comprise: purging the software application from the mobile device.

5. The mobile device of claim 1, wherein based upon a determination that the digital signature is not successfully verified, the operations further comprise: preventing execution of the software application.

6. The mobile device of claim 1, wherein based upon a determination that the digital signature is not successfully verified, the operations further comprise: denying the software application access to the sensitive API.

7. The mobile device of claim 1, wherein based upon a determination that the digital signature is not successfully verified the operations further comprise: purging the software application from the mobile device.

8. The mobile device of claim 1, wherein a global signature is associated with each of the plurality of APIs; and wherein the global signature is verified prior to allowing the software application to access the sensitive API.

9. The mobile device of claim 1, wherein at least some of the operations are performed by an application execution manager, and wherein the application execution manager is implemented by a virtual machine (VM) of the mobile device.

10. The mobile device of claim 1, wherein the digital signature is generated by applying the private key to a first hash of the software application; and the digital signature is verified by generating a second hash of the software application to obtain a generated hash, applying the public key to the digital signature to obtain a recovered hash, and verifying that the generated hash and the recovered hash are the same.

11. The mobile device of claim 1, wherein the digital signature is generated by applying the private key to a first abridged version of the software application; and the digital signature is verified by generating a second abridged version of the software application to obtain a generated abridged version, applying the public key to the digital signature to obtain a recovered abridged version, and verifying that the generated abridged version and the recovered abridged version are the same.

12. The mobile device of claim 1, wherein the digital signature is generated by a code signing authority and included with the software application.

13. The mobile device of claim 1, wherein the operations further comprise:
displaying a description string when the software application attempts to access the sensitive API.

14. The mobile device of claim 1, wherein the application platform comprises an operating system.

15. The mobile device of claim 1, wherein the application platform includes mobile device hardware.

16. The mobile device of claim 1, wherein the application platform comprises a cryptographic module.

17. The mobile device of claim 1, wherein the application platform comprises a data store.

18. The mobile device of claim 1, wherein the application platform comprises a proprietary data model.

19. The mobile device of claim 1, wherein the application platform comprises an input and output controller.

20. The mobile device of claim 1, wherein the digital signature provides an audit trail identifying a developer of the software application requesting access to the sensitive API.

21. The mobile device of claim 20, wherein a problematic software application is identified using the audit trail, and wherein the digital signature associated with the problematic software application is revocable.

22. The mobile device of claim 21, wherein the digital signature associated with the problematic software application is revoked, and wherein the revoked digital signature is added to a signature revocation list.

23. The mobile device of claim 1, wherein the digital signature is first verified each time the software application requesting access to the sensitive API is allowed to interact with the application platform.

24. The mobile device of claim 1, wherein the software application further includes a signature identification, and wherein the digital signature and the signature identification correspond to a mobile device type.

25. The mobile device of claim 1, wherein the operations further comprise obtaining the public key from a public key repository.

26. A system for controlling access to an application platform on a mobile device, comprising:
one or more processors;
one or more computer-readable storage mediums containing software instructions executable on the one or more processors to cause the one or more processors to perform operations including:
storing a plurality of application programming interfaces (APIs) at the mobile device, wherein at least one API comprises a sensitive API to which access is restricted;
receiving, at the mobile device, an indication that a software application is requesting access to the sensitive API stored at the mobile device;
determining, at the mobile device, whether the software application is signed, wherein a signed software application includes a digital signature generated using a private key of a private key-public key pair, wherein the private key is not accessible to the mobile device;
the mobile device using a public key of the private key-public key pair to verify the digital signature of the signed software application; and
based upon verifying the digital signature, the mobile device allowing the software application access to the sensitive API.

27. The system of claim 26, wherein based upon a determination that the software application requesting access to the sensitive API does not include a signature, the operations further comprise: preventing execution of the software application.

28. The system of claim 26, wherein based upon a determination that the software application requesting access to the sensitive API does not include a signature, the operations further comprise: denying the software application access to the sensitive API.

29. The system of claim 26, wherein based upon a determination that the software application requesting access to the sensitive API does not include a signature, the operations further comprise: purging the software application from the mobile device.

30. The system of claim 26, wherein based upon a determination that the digital signature is not successfully verified, the operations further comprise: preventing execution of the software application.

31. The system of claim 26, wherein based upon a determination that the digital signature is not successfully verified, the operations further comprise: denying the software application access to the sensitive API.

32. The system of claim 26, wherein based upon a determination that the digital signature is not successfully verified, the operations further comprise: purging the software application from the mobile device.

33. The system of claim 26, wherein a global signature is associated with each of the plurality of APIs; and wherein the global signature is verified prior to allowing the signed software application to access the sensitive API.

34. The system of claim 26, wherein at least some of the operations are performed by an application execution manager, and wherein the application execution manager is implemented by a virtual machine (VM) of the mobile device.

35. The system of claim 26, wherein the digital signature is generated by applying the private key to a first hash of the software application; and the digital signature is verified by generating a second hash of the software application to obtain a generated hash, applying the public key to the digital signature to obtain a recovered hash, and verifying that the generated hash and the recovered hash are the same.

36. The system of claim 26, wherein the digital signature is generated by applying the private key to a first abridged version of the software application; and the digital signature is verified by generating a second abridged version of the software application to obtain a generated abridged version, applying the public key to the digital signature to obtain a recovered abridged version, and verifying that the generated abridged version and the recovered abridged version are the same.

37. The system of claim 26, further comprising:
a code signing authority, wherein the code signing authority determines whether the software application should be given access to the sensitive API, and based upon a determination that the software application should be given access to the sensitive API, the code signing authority accepts the software application and generates the digital signature that is included with the software application.

38. The system of claim 26, wherein the operations further comprise:
displaying a description string when the software application attempts to access the sensitive API.

39. The system of claim 26, wherein the application platform comprises an operating system.

40. The system of claim 26, wherein the application platform includes mobile device hardware.

41. The system of claim 26, wherein the application platform comprises a cryptographic module.

42. The system of claim 26, wherein the application platform comprises a data store.

43. The system of claim 26, wherein the application platform comprises a proprietary data model.

44. The system of claim 26, wherein the application platform comprises an input and output controller.

45. The system of claim 26, wherein the digital signature provides an audit trail identifying a developer of the software application requesting access to the sensitive API.

46. The system of claim 45, wherein a problematic software application is identified using the audit trail, and wherein the digital signature associated with the problematic software application is revocable.

47. The system of claim 46, wherein the digital signature associated with the problematic software application is revoked, and wherein the revoked digital signature is added to a signature revocation list.

48. The system of claim 26, wherein the digital signature is first verified each time the software application requesting access to the sensitive API is allowed to interact with the application platform.

49. The system of claim 26, wherein the software application further includes a signature identification, and wherein the digital signature and the signature identification correspond to a mobile device type.

50. The system of claim 26, wherein the operations further comprise obtaining the public key from a public key repository.

51. A non-transitory computer-readable storage medium encoded with instructions that when executed on one or more processors of a mobile device, cause the mobile device to perform instructions for controlling access to an application platform of the mobile device, the instructions comprising:
storing a plurality of application programming interfaces (APIs) at the mobile device, wherein at least one API comprises a sensitive API to which access is restricted;
receiving, at the mobile device, an indication that a software application on the mobile device is requesting access to the sensitive API stored at the mobile device;
determining, at the mobile device, whether the software application is signed, wherein a signed software application includes a digital signature generated using a private key of a private key-public key pair, wherein the private key is not accessible to the mobile device;
the mobile device using the public key of the private key-public key pair to verify the digital signature of the software application; and
based upon verifying the digital signature at the mobile device, the mobile device allowing the software application access to the sensitive API.

52. The computer-readable storage medium of claim 51, wherein based upon a determination that the software application requesting access to the sensitive API does not include a signature, the instructions further comprising: preventing execution of the software application.

53. The computer-readable storage medium of claim 51, wherein based upon a determination that the software application requesting access to the sensitive API does not include a signature, the instructions further comprising: denying the software application access to the sensitive API.

54. The computer-readable storage medium of claim 51, wherein based upon a determination that the software application requesting access to the sensitive API does not include a signature, the instructions further comprising: purging the software application from the mobile device.

55. The computer-readable storage medium of claim 51, wherein based upon a determination that the digital signature is not successfully verified, the instructions further comprising: preventing execution of the software application.

56. The computer-readable storage medium of claim 51, wherein based upon a determination that the digital signature is not successfully verified, the instructions further comprising: denying the software application access to the sensitive API.

57. The computer-readable storage medium of claim 51, wherein based upon a determination that the digital signature is not successfully verified, the instructions further comprising: purging the software application from the mobile device.

58. The computer-readable storage medium of claim 51, wherein a global signature is associated with each of the plurality of APIs; and wherein the global signature is verified prior to allowing the software application to access the sensitive API.

59. The computer-readable storage medium of claim 51, wherein at least some of the instructions are performed by an application execution manager, and wherein the application execution manager is implemented by a virtual machine (VM) of the mobile device.

60. The computer-readable storage medium of claim 51, wherein the digital signature is generated by applying the private key to a first hash of the software application; and the digital signature is verified by generating a second hash of the software application to obtain a generated hash, applying the public key to the digital signature to obtain a recovered hash, and verifying that the generated hash and the recovered hash are the same.

61. The computer-readable storage medium of claim 51, wherein the digital signature is generated by applying the private key to a first abridged version of the software application; and the digital signature is verified by generating a second abridged version of the software application to obtain a generated abridged version, applying the public key to the digital signature to obtain a recovered abridged version, and verifying that the generated abridged version and the recovered abridged version are the same.

62. The computer-readable storage medium of claim 51, wherein the digital signature is generated by a code signing authority and included with the software application.

63. The computer-readable storage medium of claim 51, the instructions further comprising:
displaying a description string when the software application attempts to access the sensitive API.

64. The computer-readable storage medium of claim 51, wherein the application platform comprises an operating system.

65. The computer-readable storage medium of claim 51, wherein the application platform includes mobile device hardware.

66. The computer-readable storage medium of claim 51, wherein the application platform comprises a cryptographic module.

67. The computer-readable storage medium of claim 51, wherein the application platform comprises a data store.

68. The computer-readable storage medium of claim 51, wherein the application platform comprises a proprietary data model.

69. The computer-readable storage medium of claim 51, wherein the application platform comprises an input and output controller.

70. The computer-readable storage medium of claim 51, wherein the digital signature provides an audit trail identifying a developer of the software application requesting access to the sensitive API.

71. The computer-readable storage medium of claim 70, wherein a problematic software application is identified using the audit trail, and wherein the digital signature associated with the problematic software application is revocable.

72. The computer-readable storage medium of claim 71, wherein the digital signature associated with the problematic software application is revoked, and wherein the revoked digital signature is added to a signature revocation list.

73. The computer-readable storage medium of claim 51, wherein the digital signature is first verified each time the software application requesting access to the sensitive API is allowed to interact with the application platform.

74. The computer-readable storage medium of claim 51, wherein the software application further includes a signature identification, and wherein the digital signature and the signature identification correspond to a mobile device type.

75. The computer-readable storage medium of claim 51, the instructions further comprising obtaining the public key from a public key repository.

76. A method for controlling access to an application platform of a mobile device, comprising:
storing a plurality of application programming interfaces (APIs) at the mobile device, wherein at least one API comprises a sensitive API to which access is restricted;
receiving, at the mobile device, an indication that a software application on the mobile device is requesting access to the sensitive API stored at the mobile device;
determining, at the mobile device, whether the software application is signed, wherein a signed software application includes a digital signature generated using a private key of a private key-public key pair, wherein the private key is not accessible to the mobile device;
mobile device using a public key of the private key-public key pair to verify of the digital signature of the software application; and
based upon verifying the digital signature at the mobile device, the mobile device allowing the software application access to the sensitive API.

77. The method of claim 76, wherein based upon a determination that the software application requesting access to the sensitive API does not include a signature, the method further comprises: preventing execution of the software application.

78. The method of claim 76, wherein based upon a determination that the software application requesting access to the sensitive API does not include a signature, the method further comprises: denying the software application access to the sensitive API.

79. The method of claim 76, wherein based upon a determination that the software application requesting access to the sensitive API does not include a signature, the method further comprises: purging the software application from the mobile device.

80. The method of claim 76, wherein based upon a determination that the digital signature is not successfully verified, the method further comprises: preventing execution of the software application.

81. The mobile device of claim 76, wherein based upon a determination that the digital signature is not successfully verified, the method further comprises: denying the software application access to the sensitive API.

82. The method of claim 76, wherein based upon a determination that the digital signature is not successfully verified, the method further comprises: purging the software application from the mobile device.

83. The method of claim 76, wherein a global signature is associated with each of the plurality of APIs; and wherein the global signature is verified prior to allowing the software application to access the sensitive API.

84. The method of claim 76, wherein at least some operations of the method are performed by an application execution manager, and wherein the application execution manager is implemented by a virtual machine (VM) of the mobile device.

85. The method of claim 76, wherein the digital signature is generated by applying the private key to a first hash of the software application; and the digital signature is verified by generating a second hash of the software application to obtain a generated hash, applying the public key to the digital signature to obtain a recovered hash, and verifying that the generated hash and the recovered hash are the same.

86. The method of claim 76, wherein the digital signature is generated by applying the private key to a first abridged version of the software application; and the digital signature is verified by generating a second abridged version of the software application to obtain a generated abridged version, applying the public key to the digital signature to obtain a recovered abridged version, and verifying that the generated abridged version and the recovered abridged version are the same.

87. The method of claim 76, further comprising:
determining by a code signing authority, whether the software application should be given access to the sensitive API, wherein based upon a determination that the software application should be given access to the sensitive API, the code signing authority accepts the software application and generates the digital signature that is included with the software application.

88. The method of claim 76, further comprisinq:
displaying a description string when the software application attempts to access the sensitive API.

89. The method of claim 76, wherein the application platform comprises an operating system.

90. The method of claim 76, wherein the application platform includes mobile device hardware.

91. The method of claim 76, wherein the application platform comprises a cryptographic module.

92. The method of claim 76, wherein the application platform comprises a data store.

93. The method of claim 76, wherein the application platform comprises a proprietary data model.

94. The method of claim 76, wherein the application platform comprises an input and output controller.

95. The method of claim 76, wherein the digital signature provides an audit trail identifying a developer of the software application requesting access to the sensitive API.

96. The method of claim 95, wherein a problematic software application is identified using the audit trail, and wherein the digital signature associated with the problematic software application is revocable.

97. The method of claim 96, wherein the digital signature associated with the problematic software application is revoked, and wherein the revoked digital signature is added to a signature revocation list.

98. The method of claim 76, wherein the digital signature is first verified each time the software application requesting access to the sensitive API is allowed to interact with the application platform.

99. The method of claim 76, wherein the software application further includes a signature identification, and wherein the digital signature and the signature identification correspond to a mobile device type.

100. The method of claim 76, further comprising obtaining the public key from a public key repository.

101. The device of claim 1, wherein verifying the digital signature comprises:
hashing the software application to obtain a generated hash;
applying the public key to the digital signature to obtain a recovered hash; and
comparing the generated hash and the recovered hash.

102. The system of claim 26, wherein verifying the digital signature comprises:
hashing the software application to obtain a generated hash;
applying the public key to the digital signature to obtain a recovered hash; and
comparing the generated hash and the recovered hash.

103. The computer-readable storage medium of claim 51, wherein verifying the digital signature comprises:
hashing the software application to obtain a generated hash;
applying the public key to the digital signature to obtain a recovered hash; and
comparing the generated hash and the recovered hash.

104. The method of claim 76, wherein verifying the digital signature comprises:
hashing the software application to obtain a generated hash;
applying the public key to the digital signature to obtain a recovered hash; and
comparing the generated hash and the recovered hash.

105. The device of claim 1, wherein the plurality of APIs comprises a plurality of sensitive APIs, wherein for each of the plurality of sensitive APIs, the mobile device allows access to the sensitive API upon verification of a digital signature unique to the sensitive API.

106. The system of claim 26, wherein the plurality of APIs comprises a plurality of sensitive APIs, wherein for each of the plurality of sensitive APIs, the mobile device allows access to the sensitive API upon verification of a digital signature unique to the sensitive API.

107. The computer-readable storage medium of claim 51, wherein the plurality of APIs comprises a plurality of sensitive APIs, wherein for each of the plurality of sensitive APIs, the mobile device allows access to the sensitive API upon verification of a digital signature unique to the sensitive API.

108. The method of claim 76, wherein the plurality of APIs comprises a plurality of sensitive APIs, wherein for each of the plurality of sensitive APIs, the mobile device allows access to the sensitive API upon verification of a digital signature unique to the sensitive API.

109. The device of claim 1, wherein the operations further comprise: upon verifying the digital signature at the mobile device, the mobile device allowing the software application access to at least one non-sensitive API.

110. The system of claim 26, wherein the operations further comprise: upon verifying the digital signature at the mobile device, the mobile device allowing the software application access to at least one non-sensitive API.

111. The computer-readable storage medium of claim 51, wherein the instructions further comprises: upon verifying the digital signature at the mobile device, the mobile device allowing the software application access to at least one non-sensitive API.

112. The method of claim 76, further comprising: upon verifying the digital signature at the mobile device, the mobile device allowing the software application access to at least one non-sensitive API.

113. The mobile device of claim 1, wherein the sensitive API is associated with the public key.

114. The mobile device of claim 1, wherein the sensitive API and the public key are included in an API library.

115. The mobile device of claim 1, wherein the plurality of APIs comprises at least one non-sensitive API.

116. The mobile device of claim 115, wherein based upon a determination that the software application requesting access to the sensitive API does not include a signature, the operations further comprise:
denying the software application access to the sensitive API; and
allowing the software application access to the at least one non-sensitive API.

117. The mobile device of claim 115, wherein based upon a determination that the digital signature is not successfully verified, the operations further comprise:
denying the software application access to the sensitive API; and
allowing the software application access to the at least one non-sensitive API.

118. The mobile device of claim 1, wherein the software application includes a plurality of digital signatures.

119. The mobile device of claim 1, wherein the plurality of APIs comprises a plurality of sensitive APIs, wherein one or more of the sensitive APIs is associated with a unique digital signature.

120. The mobile device of claim 1, wherein the plurality of APIs comprises at least a second sensitive API, wherein the software application includes at least a second digital signature, wherein the operations further comprise:
using a second public key of a second private key-public key pair to verify the second digital signature of the software application; and
based upon verifying the second digital signature at the mobile device, allowing the software application access to at least the second sensitive API.

121. The system of claim 26, wherein the sensitive API is associated with the public key.

122. The system of claim 26, wherein the sensitive API and the public key are included in an API library.

123. The system of claim 26, wherein the plurality of APIs comprises at least one non-sensitive API.

124. The system of claim 123, wherein based upon a determination that the software application requesting access to the sensitive API does not include a signature, the operations further comprise:
denying the software application access to the sensitive API; and
allowing the software application access to the at least one non-sensitive API.

125. The system of claim 123, wherein based upon a determination that the digital signature is not successfully verified, the operations further comprise:
denying the software application access to the sensitive API; and
allowing the software application access to the at least one non-sensitive API.

126. The system of claim 26, wherein the software application includes a plurality of digital signatures.

127. The system of claim 26, wherein the plurality of APIs comprises a plurality of sensitive APIs, wherein one or more of the sensitive APIs is associated with a unique digital signature.

128. The system of claim 26, wherein the plurality of APIs comprises at least a second sensitive API, wherein the software application includes at least a second digital signature, wherein the operations further comprise:
using a second public key of a second private key-public key pair to verify the second digital signature of the software application; and
based upon verifying the second digital signature at the mobile device, allowing the software application access to at least the second sensitive API.

129. The computer-readable storage medium of claim 51, wherein the sensitive API is associated with the public key.

130. The computer-readable storage medium of claim 51, wherein the sensitive API and the public key are included in an API library.

131. The computer-readable storage medium of claim 51, wherein the plurality of APIs comprises at least one non-sensitive API.

132. The computer-readable storage medium of claim 131, wherein based upon a determination that the software application requesting access to the sensitive API does not include a signature, the instructions further comprise:
denying the software application access to the sensitive API; and
allowing the software application access to the at least one non-sensitive API.

133. The computer-readable storage medium of claim 131, wherein based upon a determination that the digital signature is not successfully verified, the instructions further comprise:
denying the software application access to the sensitive API; and
allowing the software application access to the at least one non-sensitive API.

134. The computer-readable storage medium of claim 51, wherein the software application includes a plurality of digital signatures.

135. The computer-readable storage medium of claim 51, wherein the plurality of APIs comprises a plurality of sensitive APIs, wherein one or more of the sensitive APIs is associated with a unique digital signature.

136. The computer-readable storage medium of claim 51, wherein the plurality of APIs comprises at least a second sensitive API, wherein the software application includes at least a second digital signature, wherein the operations further comprise:
using a second public key of a second private key-public key pair to verify the second digital signature of the software application; and
based upon verifying the second digital signature at the mobile device, allowing the software application access to at least the second sensitive API.

137. The method of claim 76, wherein the sensitive API is associated with the public key.

138. The method of claim 76, wherein the sensitive API and the public key are included in an API library.

139. The method of claim 76, wherein the plurality of APIs comprises at least one non-sensitive API.

140. The method of claim 139, wherein based upon a determination that the software application requesting access to the sensitive API does not include a signature, the method further comprising:
denying the software application access to the sensitive API; and
allowing the software application access to the at least one non-sensitive API.

141. The method of claim 139, wherein based upon a determination that the digital signature is not successfully verified, the method further comprising:
denying the software application access to the sensitive API; and
allowing the software application access to the at least one non-sensitive API.

142. The method of claim 76, wherein the software application includes a plurality of digital signatures.

143. The method of claim 76, wherein the plurality of APIs comprises a plurality of sensitive APIs, wherein one or more of the sensitive APIs is associated with a unique digital signature.

144. The method of claim 76, wherein the plurality of APIs comprises at least a second sensitive API, wherein the software application includes at least a second digital signature, the method further comprising:
using a second public key of a second private key-public key pair to verify the second digital signature of the software application; and
based upon verifying the second digital signature at the mobile device, allowing the software application access to at least the second sensitive API.

* * * * *